(12) United States Patent
Simonsen et al.

(10) Patent No.: US 6,955,367 B1
(45) Date of Patent: Oct. 18, 2005

(54) PICNIC TABLE MOVER

(75) Inventors: Robert A. Simonsen, Cherokee, IA (US); Wayne W. Morris, Cherokee, IA (US); Michael W. Reed, Cherokee, IA (US); Richard R. England, Cherokee, IA (US)

(73) Assignee: R. J. Thomas Mfg. Co., Inc., Cherokee, IA (US)

( * ) Notice: Subject to any disclaimer, the term of this patent is extended or adjusted under 35 U.S.C. 154(b) by 35 days.

(21) Appl. No.: 10/787,803

(22) Filed: Feb. 26, 2004

(51) Int. Cl.[7] .............................................. B62D 61/00
(52) U.S. Cl. ..................................... 280/78; 280/47.32
(58) Field of Search ............................... 280/78, 47.32, 280/79.11, 79.7, 47.11; 108/50.17

(56) References Cited

U.S. PATENT DOCUMENTS

| | | | |
|---|---|---|---|
| 2,636,626 A | * | 4/1953 | Ireland .................. 280/47.131 |
| 3,170,708 A | * | 2/1965 | Miller ..................... 280/47.32 |
| 3,375,019 A | * | 3/1968 | O'day ..................... 280/47.32 |
| 4,040,658 A | * | 8/1977 | Mayol ..................... 297/158.4 |
| 4,424,604 A | | 1/1984 | Dupuis |
| 4,565,382 A | | 1/1986 | Sherman |
| 4,566,708 A | | 1/1986 | Specie |
| 4,824,127 A | * | 4/1989 | Stamm .................. 280/47.331 |
| 4,974,284 A | | 12/1990 | Campbell |
| 5,586,803 A | * | 12/1996 | Overpeck ............... 297/158.3 |
| 5,855,038 A | | 1/1999 | Dispense |
| D408,111 S | | 4/1999 | Cook |
| 6,575,481 B1 | | 6/2003 | Davis |

* cited by examiner

*Primary Examiner*—Bryan Fischmann
(74) *Attorney, Agent, or Firm*—McKee, Voorhees & Sease, P.L.C.

(57) ABSTRACT

A wheeled mover for a picnic table and a method of use is disclosed. The mover includes two posts attached to opposite sides of a table. The lower ends of the posts terminate in wheels. The posts pivot between a first position wherein the picnic table rests upon the ground and a second position wherein the picnic table is raised for wheeled transport.

11 Claims, 5 Drawing Sheets

PICNIC TABLE MOVER

BACKGROUND OF THE INVENTION

1. Field of the Invention

The invention relates to the field of picnic table movers which can be easily used by park personnel.

2. Problems in the Art

The picnic table mover of the title is designed to be a commercial quality tool for use by city, county, state and federal parks and campgrounds, commercial (privately owned) campgrounds and RV parks. It is designed for customers who have a large number of tables to relocate for seasonal storage or to accommodate a special event or to simply move tables over some distance. The mover is designed to be operated by one person, but it is not designed to be towed by a tractor, mower or other utility vehicle. The mover is not intended for the homeowner who may have a table in the backyard which needs to be relocated a few feet occasionally.

The product was developed in response to inquiries from a number of government park department customers. These customers wanted a device that would allow them to relocate picnic tables using fewer employees and without using vehicles or machines. Often the temporary summer-time help in the parks do not have the training to be allowed to use some of the available machinery. It also requires additional personnel to haul, unload and operate special vehicles or machinery. Park rangers want a simple device to facilitate moving tables periodically without great expense.

Many other table movers are designed for use on wooden A-frame style tables only. In the commercial market, the A-frame style is probably the least common design. These movers are designed to attach by some means (either temporarily or permanently) to a cross support member between the legs of the A-frame table. The operator must then lift almost the entire weight of the table from the opposite end of the table, shifting as much weight as possible forward to often only a single tire or wheel. This may expose the operator to back strain. These designs are limited to A-frame style tables of 6 feet (or perhaps 8 feet) long. The operator must be able to lift significant weight and simultaneously push and steer the table. Weight distribution and a stable operation are dependent on the single wheel being properly located at the center of the width of the table. An uneven surface can complicate the operation of these movers because the table weight can shift from side to side making it difficult for the operator to maintain control. The operator may thus be exposed to potential personal injury.

The following are summaries of U.S. patents disclosing picnic table moving systems. U.S. Pat. No. 4,424,604 discloses two wheels permanently attached to the legs of an A-frame table with a levered handle to lift the other end of the table. A disadvantage of this system is that it requires lifting all of the table weight.

U.S. Pat. No. 4,566,708 discloses a 2-wheeled dolly. One end of the table is loaded into the dolly and the other end is lifted and pushed. A disadvantage of this system is that it requires lifting almost all of the table weight. Alternatively, a second dolly may be used to make a total of 4 wheels to support the table. The disadvantage of this system is that it has a lot of parts and requires 4 wheels just to move a table.

U.S. Pat. No. 4,974,284 discloses two wheels permanently attached to the side legs of an A-frame table. A disadvantage of this system is that it requires lifting all of the table weight by lifting the opposite seat. This concept could not be adapted to steel frame tables because casters attach to the frame and would stick out past the seat planks providing a tripping hazard.

U.S. Pat. No. 5,855,038 discloses a retractable wheel assembly that attaches to one end of the picnic table. To move the table, the wheels are put down, touching the ground. A person then lifts the table from the end opposite the wheels. The disadvantage of this system is that it requires lifting all of the table weight.

U.S. Pat. No. 6,575,481 discloses a wheeled attachment attachable to the front end of a picnic table and a pair of handles for attachment to a second end of the table for lifting the table onto the front end wheel during transportation of the table. The disadvantage of this system is that it requires lifting all of the table weight and, with only one wheel, it is unstable.

One object of the present invention is to develop a simple, manual table mover, operable by one person without stress or strain.

Another object of the present invention is to develop a table mover that can be used in areas of parks that are off limits to motorized vehicles.

A yet further object of the present invention is to develop a picnic table mover which can easily be used and then quickly removed and stored so that the park users won't have access to move tables to unauthorized places.

A still further object of the present invention is to develop a picnic table mover which is designed to accommodate most any table that has a seat, regardless of frame design.

And, one more object of the present invention is to develop a picnic table mover which is designed to avoid stress and strain injury for the user since it is stable and easy to balance.

The method and manner of accomplishing these and other objectives will be apparent from the detailed description which follows.

SUMMARY OF THE INVENTION

The invention is both a method of moving a picnic table and the equipment to effectuate the move. The method comprises attaching a post, with a wheel attached to the lower end of the post, along the outside edge of a picnic table seat midway between the ends of the seat; attaching a seat hook on the inside edge of the seat; sliding the seat hook sequentially through a hole in an inner side plate, a hole in the post and a hole in an outer side plate; securing the seat hook in place with a pin; installing a first lifting pin into the outer side plate and the inner side plate, sequentially; pivoting the post until it is approximately perpendicular to the ground so as to raise the table; installing a second lifting pin into the outer side plate and inner side plate, sequentially; repeating these steps on the other side of the table; lifting the table at one end; and rolling the table to the desired location.

The equipment is the wheeled mover used to accomplish the method. It comprises a post, with an upper and lower end, adapted for attachment to a picnic table seat, and pivotal between a first position wherein the picnic table rests upon the ground and a second position wherein the picnic table is raised for wheeled transport; a wheel on the lower end of the post to rollably support the table when the post is in the second position; a seat hook extending from the post to engage the seat; an inner side plate and an outer side plate with the seat hook going through the inner side plate, the post and the outer side plate and the seat hook fastened with a pin outside the outer side plate and lifting pins that fit through the side plates and under the picnic table seat, lifting the seat. It is all manual without a power unit.

DETAILED DESCRIPTION OF THE PREFERRED EMBODIMENT

Figure 1:
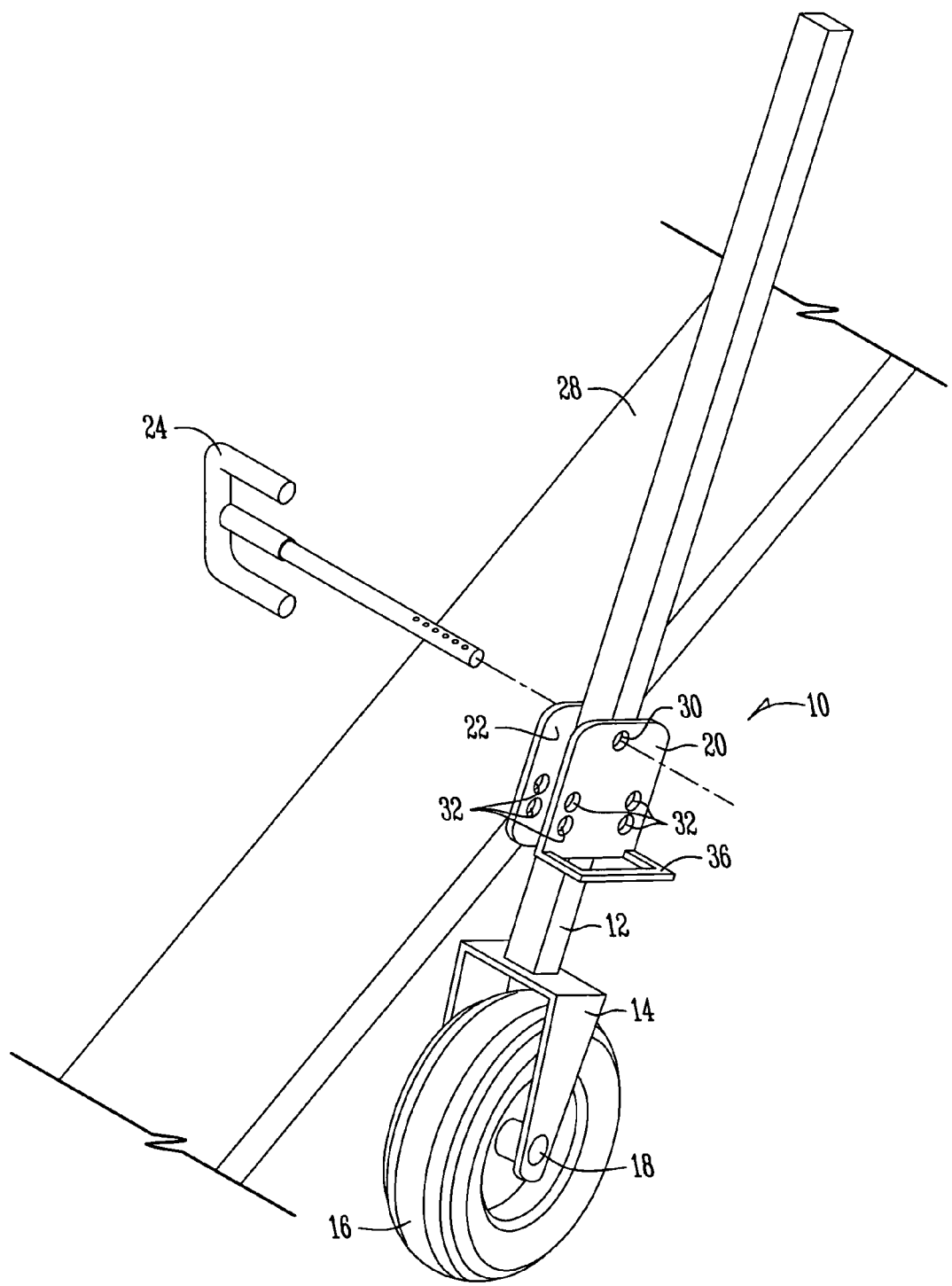
FIG. 1 presents the table mover along the outside edge of a seat plank, near the center of the table, with the smooth inner side plate against the seat plank, and with the seat hook ready to insert through the inner side plate, the table mover post and the outer side plate.

With reference to FIG. 1, the table mover as a whole is represented by 10. The table mover 10 is positioned along the outside edge of a seat plank 28, near the center of the table, with the smooth inner side plate 22 against the seat plank 28. The table mover post is 12. Attached to the bottom of the table mover post 12 are spaced bracket arms 14 that go around each side of the wheel 16 and attach to an axle (not shown). Attached to either side of the table mover post 12 are the outer side plate 20 and the inner side plate 22. The seat hook 24 is positioned to hook around the seat plank 28 of the picnic table and is ready for insertion through holes in the inner side plate 22, the table mover post 12 and the outer side plate 20, exiting at the outer seat hook hole 30. There are two different size seat hooks 24. Use the seat hook 24 that provides the tightest fit to the seat plank 28.

Figure 2:
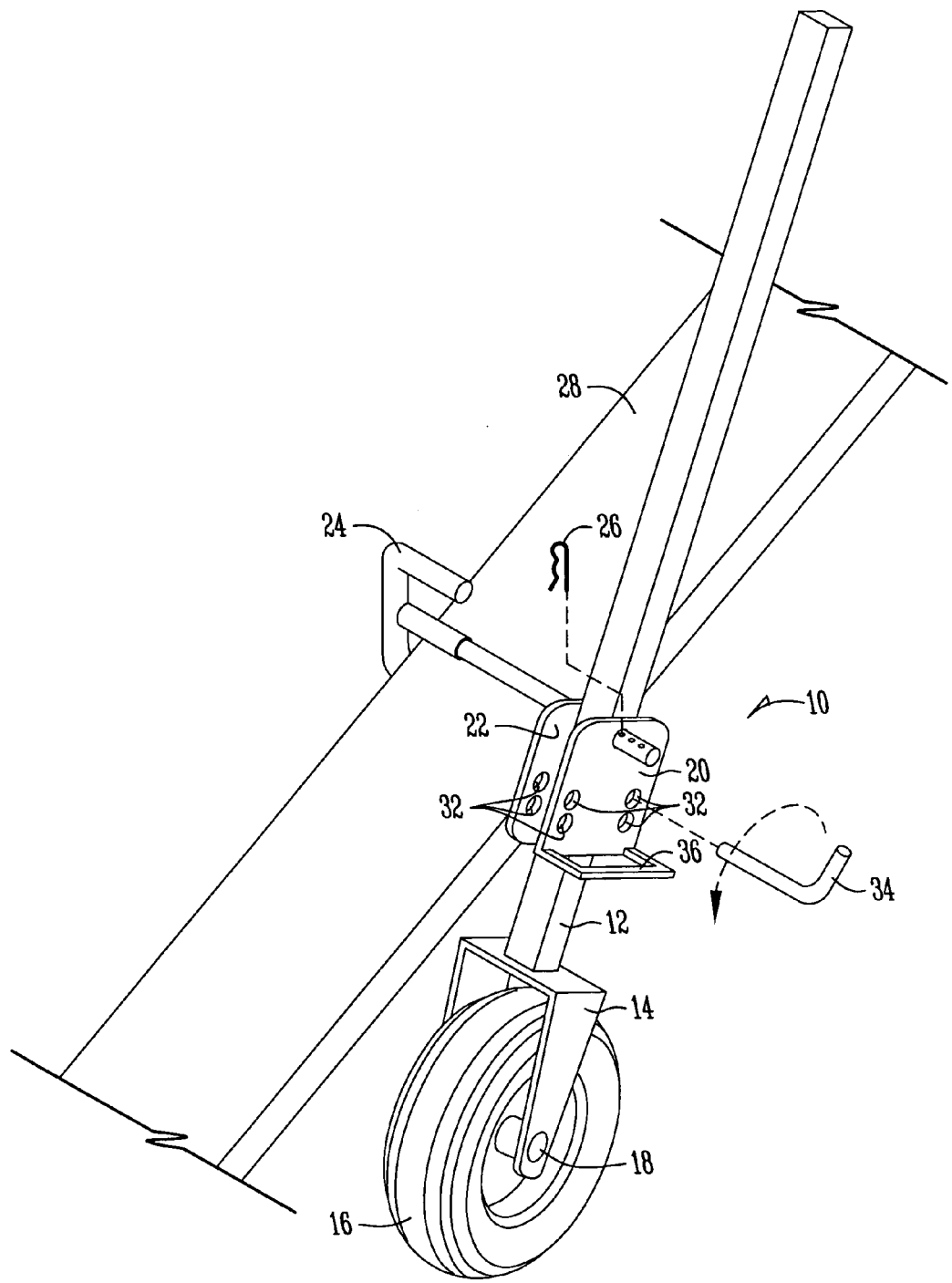
FIG. 2 presents the table mover with the seat hook inserted ready to be secured with a Cotter pin and the first lifting pin ready for insertion into the outer and then inner side plates.

With reference to FIG. 2, the table mover as a whole is represented by 10 and the table mover post is 12. Attached to either side of the table mover post 12 are the outer side plate 20 and the inner side plate 22. The seat hook 24 is hooked around the seat plank 28 of the picnic table and is inserted through holes in the inner side plate 22, the table mover post 12 and the outer side plate 20, exiting at the outer seat hook hole 30. A pin 26 is ready for insertion into a hole drilled into the end of the seat hook 24. The pin 26 secures the seat hook 24 in place. A lifting pin 34 is ready for insertion in one of the lifting pin holes 32. The first lifting pin 34 is inserted into a lifting pin hole 32 that is on the right side of the outer side plate 20 and is below the seat plank 28. The upper lifting pin holes 32 are appropriate for 1½% to 2 inch thick seat material while the lower lifting pin holes 32 are for seat plank 28 material 3 inches or thicker.

Figure 3:
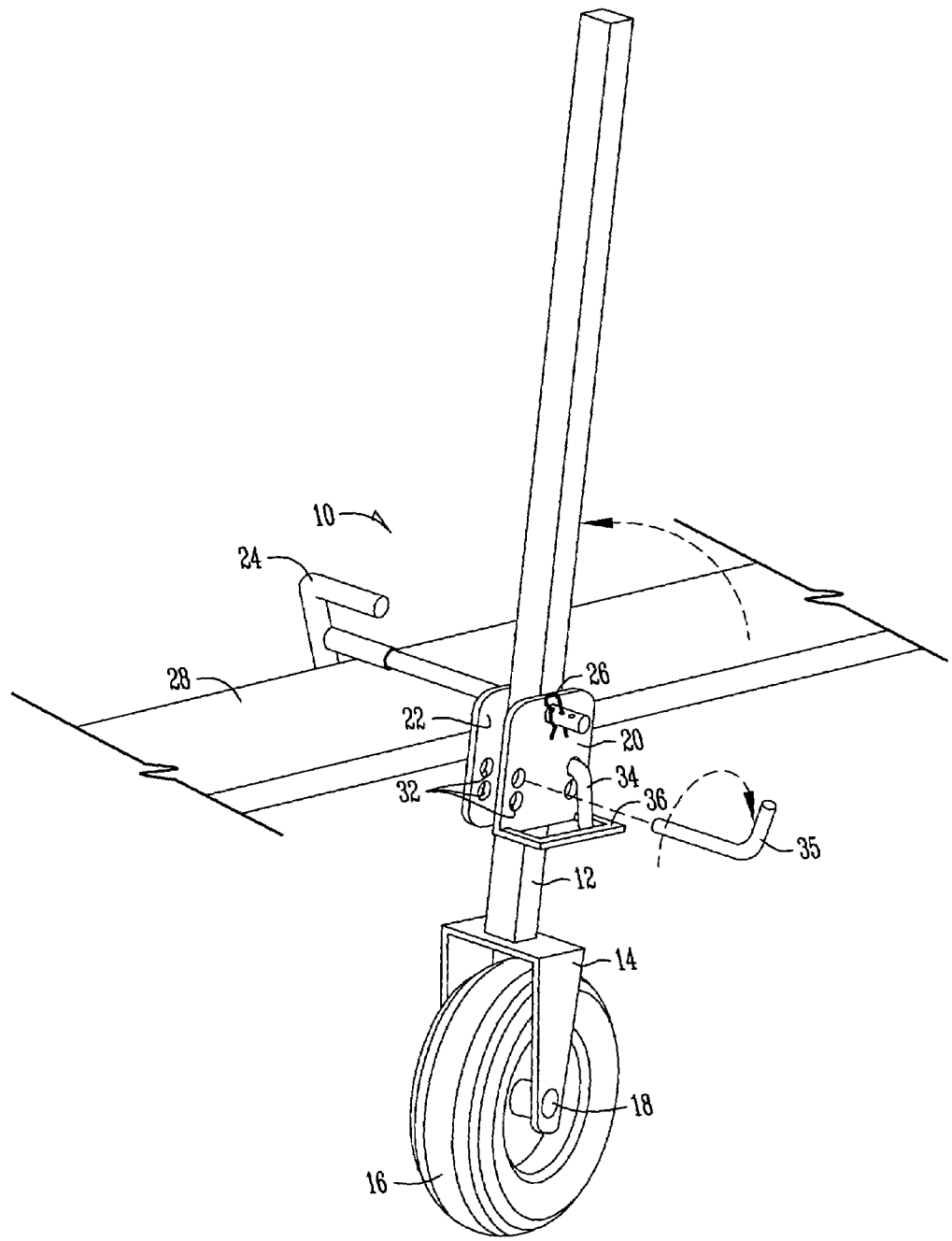
FIG. 3 presents the table mover ready for insertion of the second lifting pin into the outer and then inner side plates and then the handle secured, like the first lifting pin handle, inside the lifting pin loop.

With reference to FIG. 3, the table mover as a whole is represented by 10 and the table mover post is 12. The table mover post 12 is pulled up so that it is approximately perpendicular with the seat plank 28 and the ground. Attached to the bottom of the table mover post 12 are spaced bracket arms 14 that go around each side of the wheel 16 and attach to an axle 18. The seat hook 24 and the first lifting pin 34 are already installed. The first lifting pin 34 is held in place by the lifting pin loop 36. The second lifting pin 35 is ready for insertion in a lifting pin hole 32 on the other side of the post, opposite and at the same height where the first lifting pin 34 is inserted. The lifting pin loop 36 is attached to the bottom of the outer side plate. The second lifting pin 35 is held in place by the lifting pin loop 36.

Figure 4:
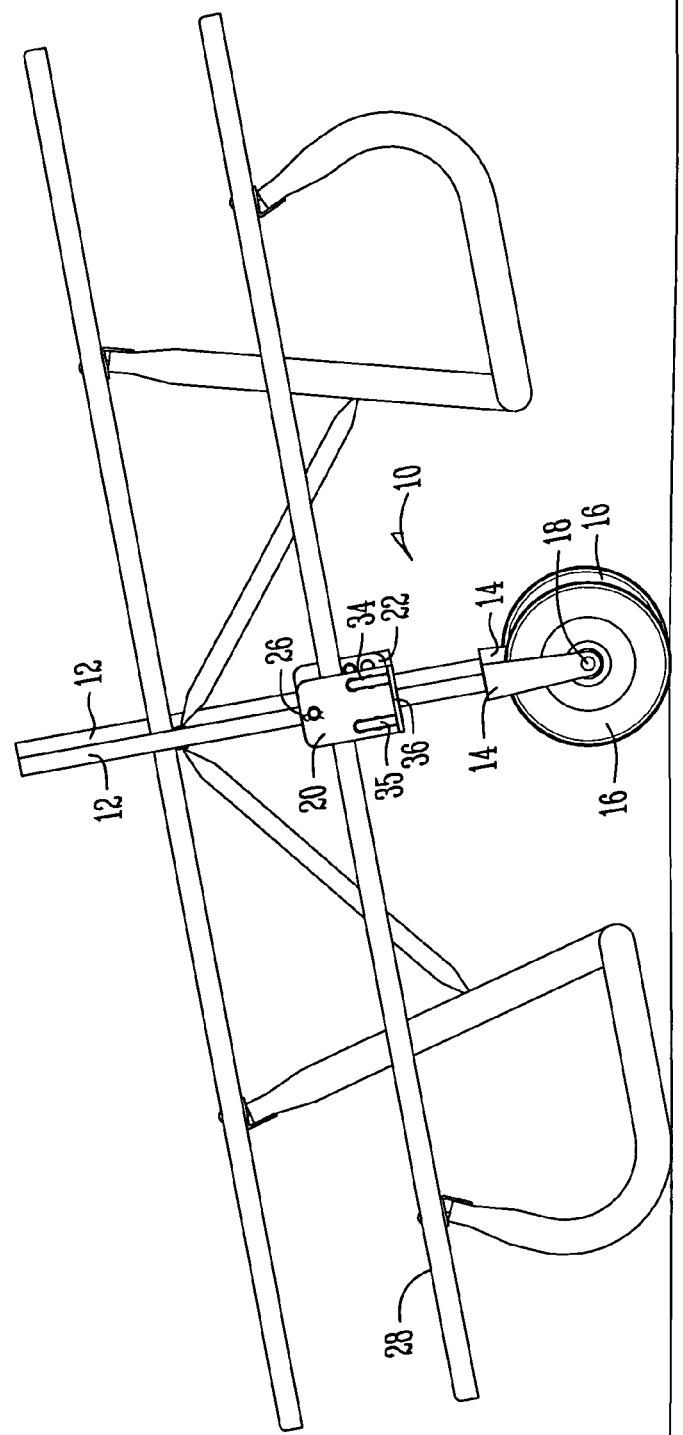
FIG. 4 presents both sides of the table mover attached to a picnic table, ready for moving.
Figure 5:
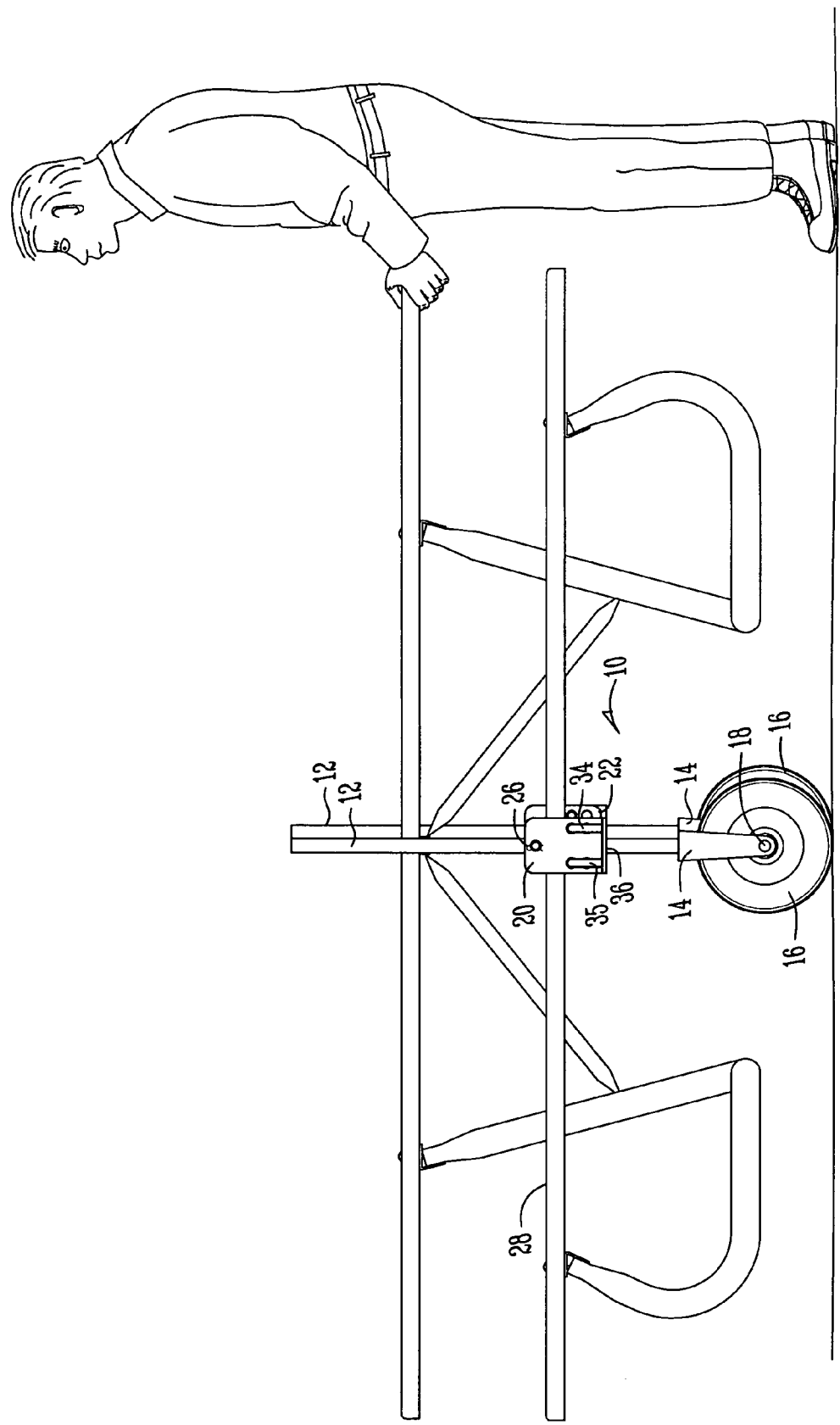
FIG. 5 presents the table mover attached to a picnic table, being moved.

The first side of the table is now raised on one wheel 16. The same procedure is followed on the second side of the table so the table is supported on two wheels (FIG. 4). Then the end of the table is lifted and, by pushing or pulling, the table moved (FIG. 5).

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A wheeled mover for a picnic table having a seat on each side of the table comprising:
    a post, with an upper end and a lower end, adapted for attachment to a picnic table seat, and pivotal between a first position wherein the picnic table rests upon the ground and a second position wherein the picnic table is raised for wheeled transport and
    a wheel on the lower end of the post to rollably support the table when the post is in the second position.

2. The wheeled picnic table mover of claim 1 further comprising:
    a seat hook extending from the post to engage the seat.

3. The wheeled picnic table mover of claim 1 wherein the wheel is a pneumatic tire.

4. The wheeled picnic table mover of claim 1 wherein the lower end of the post is connected to spaced bracket arms, an axle is attached to each side of the bracket arms and the wheel rides on the axle.

5. The wheeled picnic table mover of claim 1 further comprising:
    an inner side plate and an outer side plate with the seat hook going through the inner side plate, the post and the outer side plate and the seat hook fastened with a pin outside the outer side plate.

6. The wheeled picnic table mover of claim 1 further comprising lifting pins that fit through the side plates and under the picnic table seat, lifting the seat.

7. A method of moving a picnic table having a seat on each side of the table, the seats each having opposite ends, the method comprising:
    a. attaching a post with a wheel attached to the lower end of the post to a seat midway between the ends of the seat;
    b. pivoting the post until it is approximately perpendicular to the ground so as to raise the table
    c. repeating steps a–b on the other side of the table;
    d. manually lifting the table at one end; and
    e. rolling the table to the desired location.

8. The method of claim 7 additionally comprising attaching a seat hook to the seat and mounting the seat hook to the post.

9. The method of claim 8 additionally comprising installing a first lifting pin into an outer side plate and an inner side plate, sequentially.

10. The method of claim 9 additionally comprising installing a second lifting pin into the outer side plate and inner side plate, sequentially.

11. The method of claim 10 additionally comprising the step of securing both lifting pins with a retainer.

* * * * *